United States Patent
Cook

(10) Patent No.: US 10,577,868 B2
(45) Date of Patent: Mar. 3, 2020

(54) MACROSCOPIC DRILL BIT REINFORCEMENT

(71) Applicant: Halliburton Energy Services, Inc., Houston, TX (US)

(72) Inventor: Grant O. Cook, Spring, TX (US)

(73) Assignee: Haliburton Energy Services, Inc., Houston, TX (US)

( * ) Notice: Subject to any disclaimer, the term of this patent is extended or adjusted under 35 U.S.C. 154(b) by 253 days.

(21) Appl. No.: 15/541,637

(22) PCT Filed: Mar. 5, 2015

(86) PCT No.: PCT/US2015/018937
§ 371 (c)(1),
(2) Date: Jul. 5, 2017

(87) PCT Pub. No.: WO2016/140675
PCT Pub. Date: Sep. 9, 2016

(65) Prior Publication Data
US 2017/0342779 A1 Nov. 30, 2017

(51) Int. Cl.
*E21B 10/42* (2006.01)
*E21B 10/54* (2006.01)
(Continued)

(52) U.S. Cl.
CPC .............. *E21B 10/54* (2013.01); *B22D 19/02* (2013.01); *E21B 10/42* (2013.01); *B33Y 80/00* (2014.12)

(58) Field of Classification Search
CPC .......... E21B 10/42; E21B 10/54; E21B 10/46; B22D 19/02; B33Y 80/00; B22F 2005/001
See application file for complete search history.

(56) References Cited

U.S. PATENT DOCUMENTS

| 4,667,756 A | 5/1987 | King et al. |
| 4,999,256 A | 3/1991 | Prewo et al. |

(Continued)

FOREIGN PATENT DOCUMENTS

CA    1287343 C    8/1991

OTHER PUBLICATIONS

International Preliminary Report on Patentability issued in related Application No. PCT/US2015/018937, dated Sep. 14, 2017 (11 pages).

(Continued)

*Primary Examiner* — Catherine Loikith
(74) *Attorney, Agent, or Firm* — Alan Bryson; Baker Botts L.L.P.

(57) ABSTRACT

Systems and methods for manufacturing a macroscopically reinforced metal-matrix composite (MMC) fixed-cutter bit are provided. The reinforced drill bit may include a bit body constructed from an infiltrated MMC material and featuring several blade portions extending radially outward and downward from a shank of the drill bit. These blade portions are designed for contacting a subterranean formation. The drill bit also includes the shank, which is coupled to an end of the bit body opposite the blade portions, to connect the bit body to an upstream component of a drill string. The drill bit further includes a number of macroscopic bit reinforcements that are at least partially enclosed within the bit body. These bit reinforcements are each disposed in and aligned substantially with a corresponding blade portion of the bit body.

20 Claims, 5 Drawing Sheets

(51) Int. Cl.
    *E21B 10/46*    (2006.01)
    *B22D 19/02*    (2006.01)
    *B33Y 80/00*    (2015.01)

(56) References Cited

U.S. PATENT DOCUMENTS

| | | | |
|---|---|---|---|
| 5,394,930 | A | 3/1995 | Kennerknecht |
| 5,702,542 | A | 12/1997 | Brown et al. |
| 5,878,634 | A * | 3/1999 | Tibbitts ............... B23P 11/025 175/417 |
| 6,029,544 | A | 2/2000 | Katayama |
| 6,484,826 | B1 | 11/2002 | Anderson et al. |
| 7,160,503 | B2 | 1/2007 | Weaver |
| 7,169,465 | B1 | 1/2007 | Karandikar et al. |
| 7,594,554 | B2 | 9/2009 | Schwefe et al. |
| 7,784,381 | B2 | 8/2010 | Ladi et al. |
| 7,866,419 | B2 | 1/2011 | Lockwood |
| 8,230,762 | B2 | 7/2012 | Choe et al. |
| 8,261,632 | B2 | 9/2012 | Stevens |
| 8,616,089 | B2 | 12/2013 | Choe et al. |
| 2006/0231293 | A1 | 10/2006 | Ladi et al. |
| 2008/0314645 | A1 | 12/2008 | Hall et al. |
| 2010/0133805 | A1 | 6/2010 | Stevens et al. |
| 2010/0155148 | A1 | 6/2010 | Choe et al. |
| 2010/0193255 | A1 | 8/2010 | Stevens et al. |
| 2010/0320005 | A1 | 12/2010 | Burhan et al. |
| 2011/0107586 | A1 | 5/2011 | Choe et al. |
| 2013/0015000 | A1 | 1/2013 | Zhang et al. |
| 2013/0020134 | A1 | 1/2013 | Azar et al. |
| 2013/0146370 | A1 | 6/2013 | Zahradnik |
| 2013/0180786 | A1 | 7/2013 | Thomas et al. |

OTHER PUBLICATIONS

International Search Report and Written Opinion issued in related PCT Application No. PCT/US2015/018937 dated Nov. 23, 2015, 12 pages.
Examiner's Letter issued in related Canadian application No. 2,971,695, dated May 15, 2018 (7 pages).

* cited by examiner

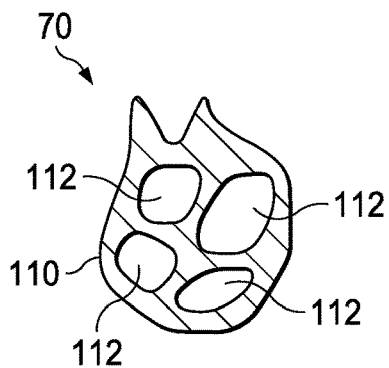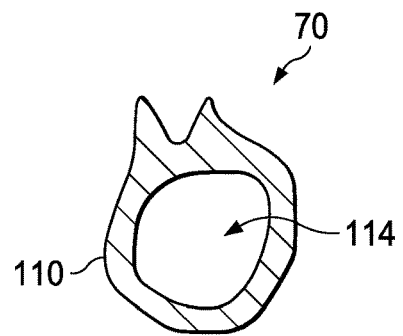
FIG. 5A  FIG. 5B
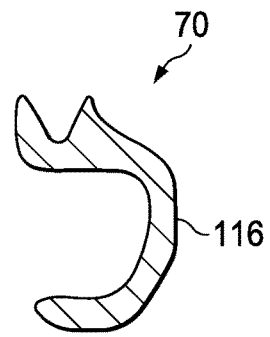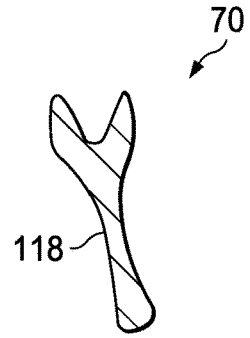
FIG. 5C  FIG. 5D
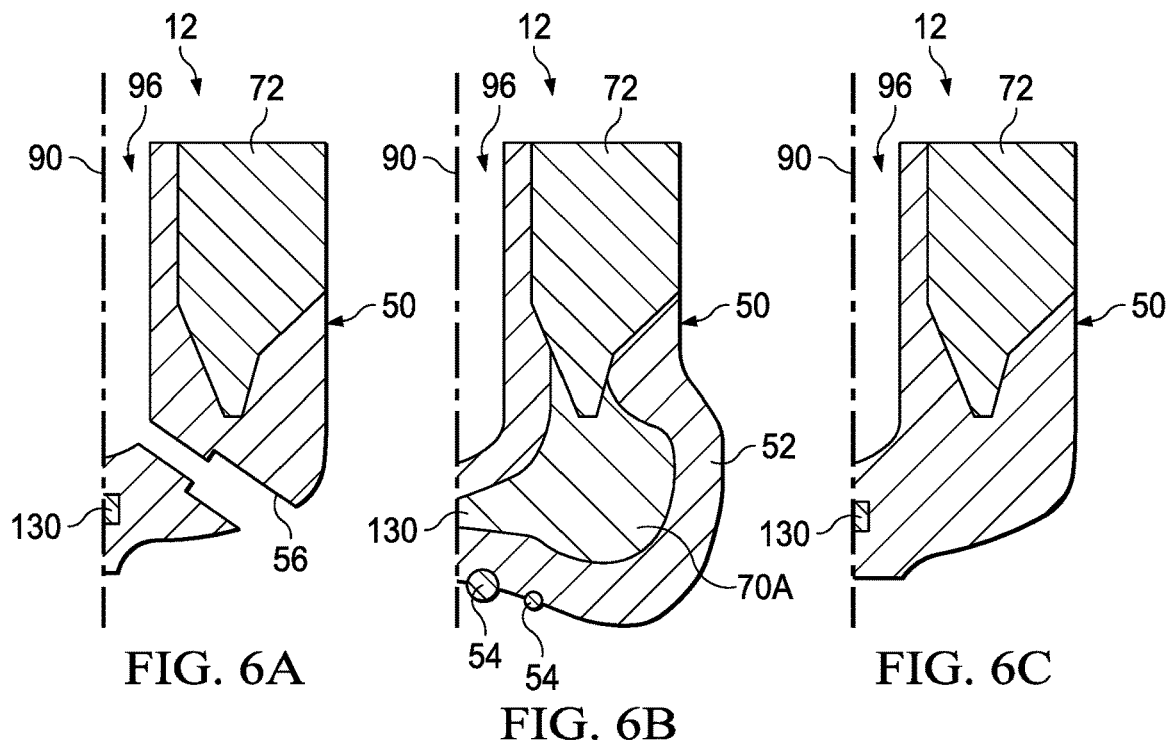
FIG. 6A  FIG. 6B  FIG. 6C

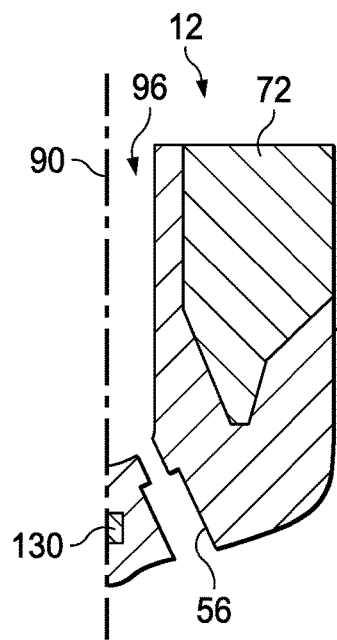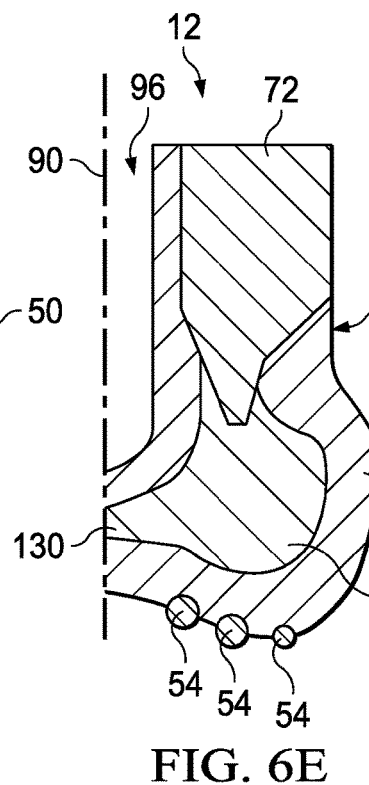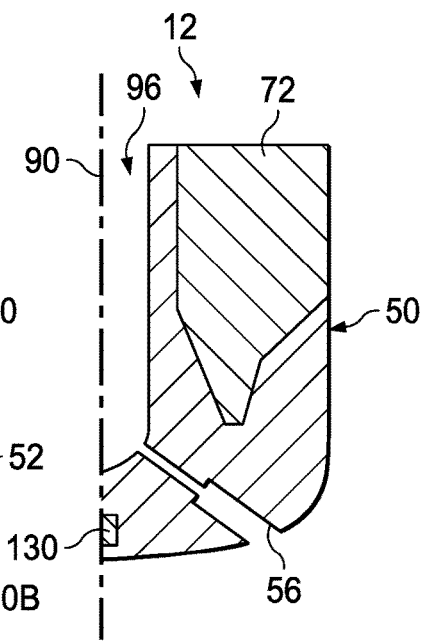
FIG. 6D  FIG. 6E  FIG. 6F
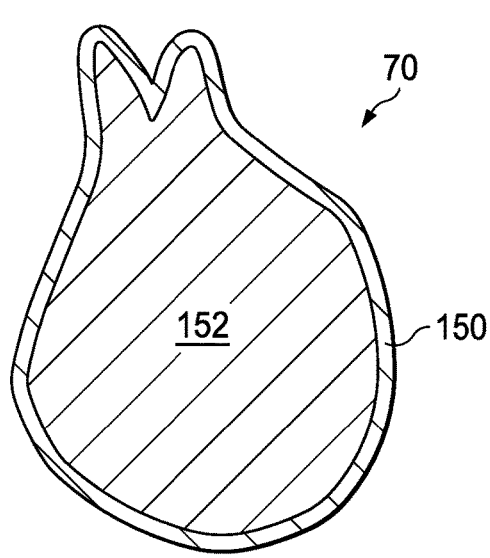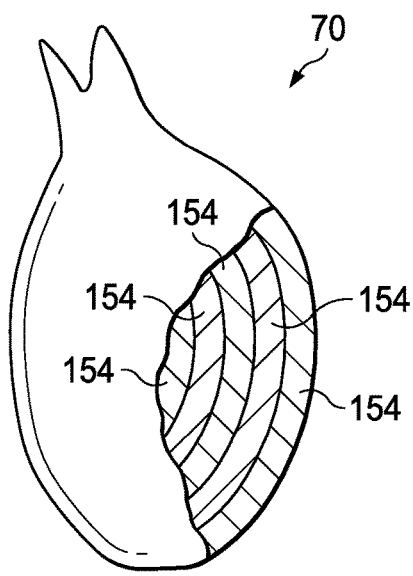
FIG. 7  FIG. 8

MACROSCOPIC DRILL BIT REINFORCEMENT

CROSS-REFERENCE TO RELATED APPLICATION

The present application is a U.S. National Stage Application of International Application No. PCT/US2015/018937 filed Mar. 5, 2015, which is incorporated herein by reference in its entirety for all purposes.

TECHNICAL FIELD

The present disclosure relates generally to drill bits and, more particularly, to systems and methods for manufacturing fixed-cutter drill bits with macroscopic reinforcements.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

In conventional drilling operations, a drill bit is mounted in a bottom hole assembly (BHA) at the end of a drill string (e.g., drill pipe plus drill collars). At the surface a rotary drive turns the string, including the bit at the bottom of the hole, while drilling fluid (or "mud") is pumped through the string. Drill bits typically include cones and/or hardened inserts to mechanically contact and drill through the subterranean formation, thereby advancing the wellbore. Drill bits with hardened inserts affixed to a bit body are known as "fixed-cutter" drill bits. Some fixed-cutter drill bits include a bit body formed by casting an infiltrated metal-matrix composite (MMC) material in a mold. The mechanical properties (e.g., stiffness, toughness) of these infiltrated MMC fixed-cutter bits are typically selected to promote the goal of effectively advancing the wellbore through the subterranean formation. For example, the mechanical properties of the MMC fixed-cutter bit can be selected in an effort to avoid or minimize undesirable crack propagation through the bit body.

BRIEF DESCRIPTION OF THE DRAWINGS

For a more complete understanding of the present disclosure and its features and advantages, reference is now made to the following description, taken in conjunction with the accompanying drawings, in which:

FIGS. 5A-5D illustrate cross sections of various macroscopic reinforcements that may be used in the drill bit of FIG. 2, in accordance with an embodiment of the present disclosure;

FIGS. 6A-6F are radial cross sectional views of the reinforced drill bit of FIG. 2, in accordance with an embodiment of the present disclosure;

FIG. 7 is a cross sectional view of a macroscopic reinforcement that may be used in the drill bit of FIG. 2, in accordance with an embodiment of the present disclosure; and FIG. 8 is a partial cross sectional view of a macroscopic reinforcement that may be used in the drill bit of FIG. 2, in accordance with an embodiment of the present disclosure.

DETAILED DESCRIPTION

Illustrative embodiments of the present disclosure are described in detail herein. In the interest of clarity, not all features of an actual implementation are described in this specification. It will, of course, be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for manufacturing a macroscopically reinforced metal-matrix composite (MMC) fixed-cutter bit. The reinforced drill bit may include a bit body constructed from an infiltrated MMC material and featuring several blade portions extending radially outward and downward from a shank of the drill bit. These blade portions are designed for contacting a subterranean formation. The drill bit also includes the shank, which is coupled to an end of the bit body opposite the blade portions, to connect the bit body to an upstream component of a drill string. The drill bit further includes a number of macroscopic bit reinforcements that are at least partially enclosed within the bit body. These bit reinforcements are each disposed in and aligned substantially with a corresponding blade portion of the bit body.

The bit reinforcements may be designed to each have a higher elastic modulus than the MMC material used to make the bit body. Thus, the reinforcements can provide an enhanced stiffness to the blade portions of the drill bit. This increased stiffness may reduce the deflection of the blades and cutters of the drill bit, thereby increasing the lifetime of the drill bit. The bit reinforcements may be used to increase an overall stiffness of the blades compared to existing drill bits, since the reinforcements have a higher stiffness that can be added to the currently used MMC material. The bit reinforcement may also be used to increase an overall toughness of the blades while maintaining a comparable stiffness level compared to existing drill bits. To that end, the increased bulk stiffness from the reinforcements may facilitate the use of a MMC material having a lower stiffness and, therefore, higher toughness than those used in existing drill bits.

Figure 1:
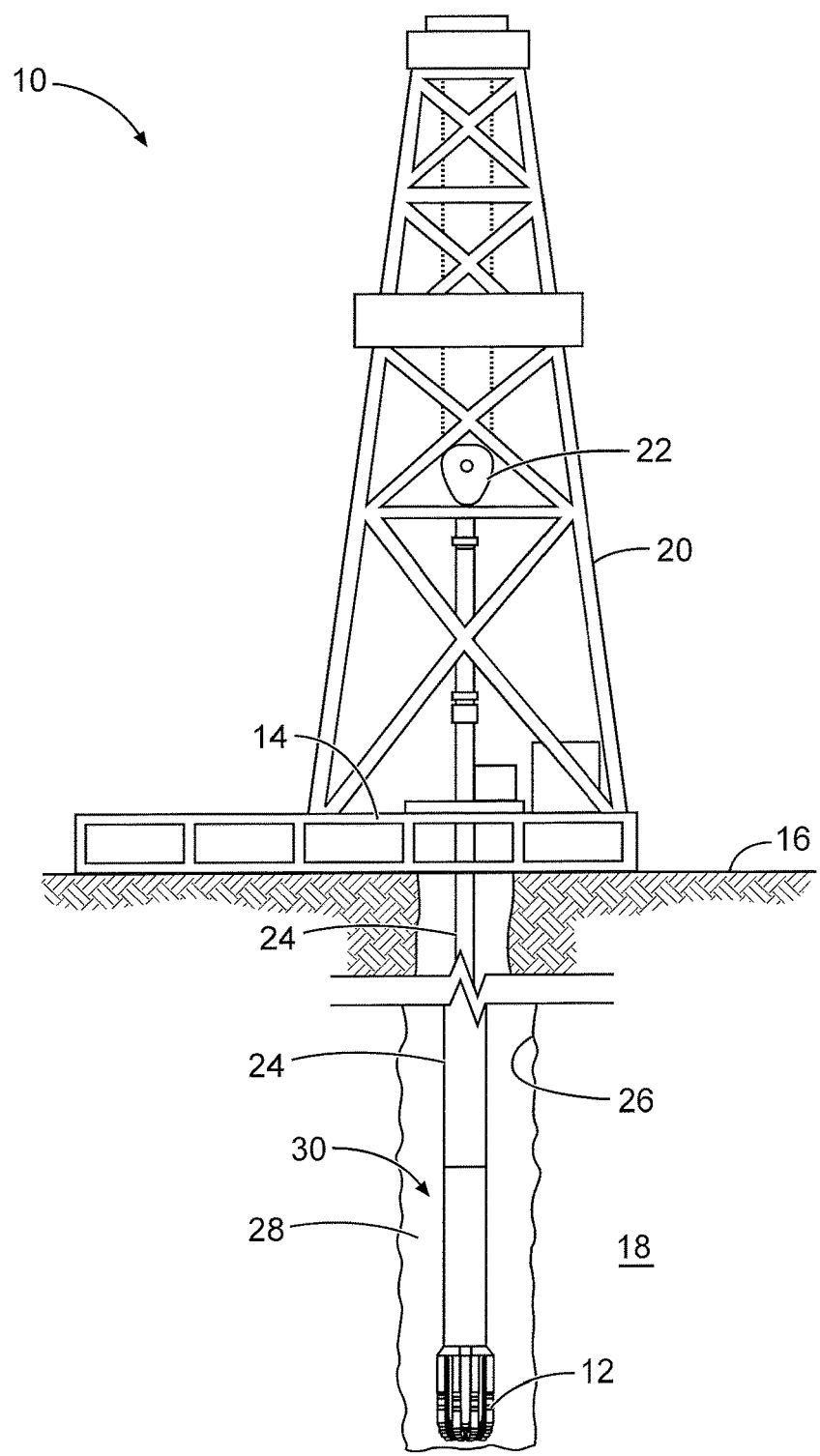
FIG. 1 is a schematic illustration of a drilling system being used to drill a wellbore, in accordance with an embodiment of the present disclosure.

Turning now to the drawings, FIG. 1 is a diagram of an example drilling system 10 incorporating a reinforced fixed-cutter drill bit 12, according to aspects of the present disclosure. The drilling system 10 may include a drilling platform 14 positioned at a surface 16. In the embodiment shown, the surface 16 includes the top of a formation 18, and the drilling platform 14 may be in contact with the surface 16. In other embodiments, such as in an off-shore drilling operation, the surface 16 may be separated from the drilling platform 14 by a volume of water. A derrick 20 may be supported by the drilling platform 14 and have a traveling block 22 for raising and lowering a drill string 24 through a wellbore 26 created by the drill bit 12. When the drilling system 10 is in use, the drill bit 12 may rotate and extend the wellbore 26 through a portion of the formation 18 in front of the drill bit 12.

The drill bit 12 may be coupled to the drill string 24 and driven by a downhole motor and/or rotation of the drill string 24 by a rotary table and kelly, or by a top drive. A pump may circulate drilling fluid through a feed pipe to the kelly or top drive, downhole through the interior of drill string 24, through orifices in the drill bit 12, back to the surface via an annulus 28 around the drill string 24, and into a retention pit. The drilling fluid transports cuttings from the wellbore 26 into the pit and aids in maintaining integrity of the wellbore 26.

The drilling system 10 may further include a bottom hole assembly (BHA) 30 coupled to the drill string 24 near the drill bit 12. The BHA 30 may include various downhole measurement tools and sensors, such as logging while drilling (LWD) or measurement while drilling (MWD) tools, one or more telemetry systems, and/or a downhole motor, among other components.

In presently disclosed embodiments, the drill bit 12 may be a fixed-cutter drill bit, meaning that the drill bit 12 features a bit body that remains fixed with respect to the drill string 24 as the drill string 24 is rotated. The fixed-cutter drill bit 12 may be specifically shaped to cut into the formation 18 as the bit 12 is rotated. To that end, the drill bit 12 may include a plurality of hardened cutters, or inserts, pressed into or bonded onto the outside of the bit body to further facilitate cutting into the formation 18. The body portion of the disclosed drill bit 12 may be formed from an infiltrated metal-matrix composite (MMC) material that has been cast in a desired shape. In addition, the presently disclosed drill bit 12 may feature one or more relatively stiff bit reinforcements disposed within specific portions of the bit body. These bit reinforcements, as described below, may improve the stiffness of the drill bit blades that are used to cut into the formation 18.

Figure 2:
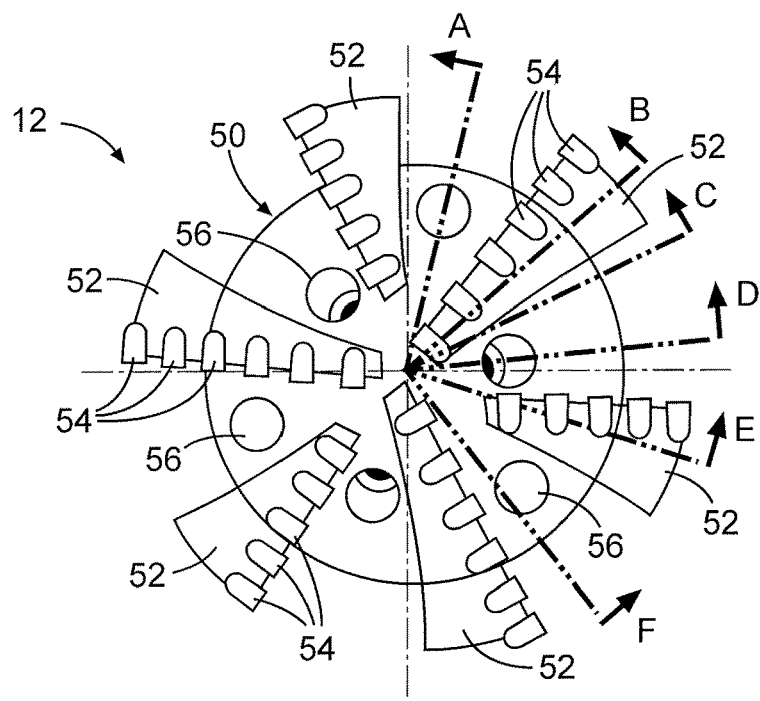
FIG. 2 is a bottom view of a reinforced fixed-cutter drill bit, in accordance with an embodiment of the present disclosure.

FIG. 2 provides a bottom view of an embodiment of the drill bit 12 having macroscopic bit reinforcements disposed therein. The term "macroscopic" may refer to a relative size of the bit reinforcements compared with the size of the metal matrix particles that are infiltrated to form the bit body. Specifically, the macroscopic bit reinforcements in the drill bit 12 may be several times larger in volume than the particles used to form the matrix material that surrounds the bit reinforcements.

In the illustrated embodiment of FIG. 2, the drill bit 12 may include a bit body 50 and several macroscopic bit reinforcements that are fully surrounded by the bit body 50. Thus, the reinforcements are not visible in the bottom view provided in the illustrated embodiment. In other embodiments, the bit reinforcements may only be partially surrounded (e.g., surrounded on three sides) by the bit body 50.

The bit body 50 may be constructed from an infiltrated metal-matrix composite (MMC) material. The infiltrated MMC material may be a composite material formed by providing a reinforcing particulate (e.g., ceramic material) as a powder and infiltrating the reinforcing particles with a molten bonding agent used to fill in the space available between the powder elements. In some embodiments, as described below, the bit body 50 may be formed by filling a drill bit shaped mold with the reinforcing powder and the molten infiltrating material, and cooling the resulting composite mixture cast within the mold. In some embodiments, the reinforcing particulate may include tungsten carbide powder. In addition, the material used to form the metal matrix may include a certain amount of copper-based alloy, or some mixture of copper, nickel, manganese, and/or other elements. Additional suitable binder materials include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. These additional elements may provide increased strength, hardness, and/or erosion resistance to the bit body 50.

Examples of suitable reinforcing particles include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOYO alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated.

In the illustrated embodiment, the drill bit 12 may be a six-bladed bit. That is, the bit body 50 may include six blade portions 52 that extend radially outward and downward from a shank (not shown) of the drill bit 12. These blade portions 52 are generally used to contact the formation (e.g., formation 18 of FIG. 1). Each of the blade portions 52 may feature several cutters 54, which are hardened components used to impact and cut into the formation 18 as the drill bit 12 is rotated. As illustrated, the cutters 54 may be arranged along an edge of each blade portion 52 that is expected to make first contact with the formation 18 during drilling. It should be noted that other arrangements or locations of the cutters 54 on the bit body 50 may be utilized. For example, the cutters 54 may be arranged in two or more rows along each blade portion 52, or some cutters 54 may be positioned along other parts of the bit body 50 besides the blade portions 52. In some embodiments, the cutters 54 may be brazed onto the bit body 50, although other techniques for securing the cutters 54 to the MMC bit body 50 may be used as well.

In addition to the blade portions 52 having the cutters 54, the illustrated bit body 50 may be formed with a number of nozzle channels 56. As illustrated, these nozzle channels 56 are generally routed through the bit body 50 at positions located between the blade portions 52. These nozzle channels 56 may be used to support nozzles, and these nozzles may direct a flow of pressurized drilling fluid through the drill bit 12 to wash formation cuttings out of the path of the drill bit 12.

Figure 3:
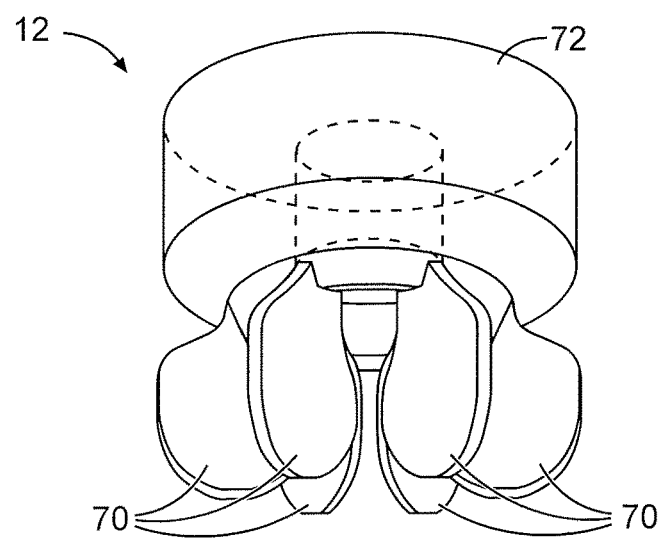
FIG. 3 is a perspective view of components of the reinforced drill bit of FIG. 2, in accordance with an embodiment of the present disclosure.
Figure 4A:
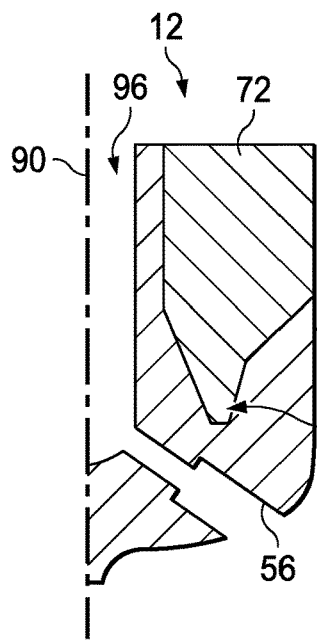
FIGS. 4A-4F are radial cross sectional views of the reinforced drill bit of FIG. 2, in accordance with an embodiment of the present disclosure.
Figure 4B:
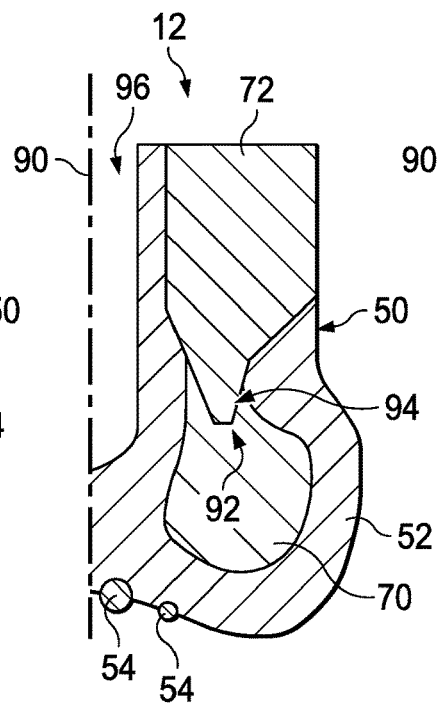
Figure 4C:
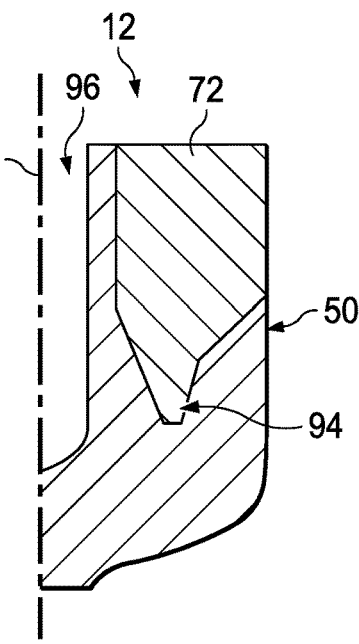
Figure 4D:
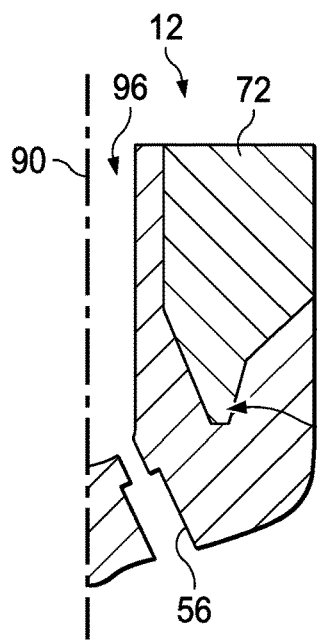
Figure 4E:
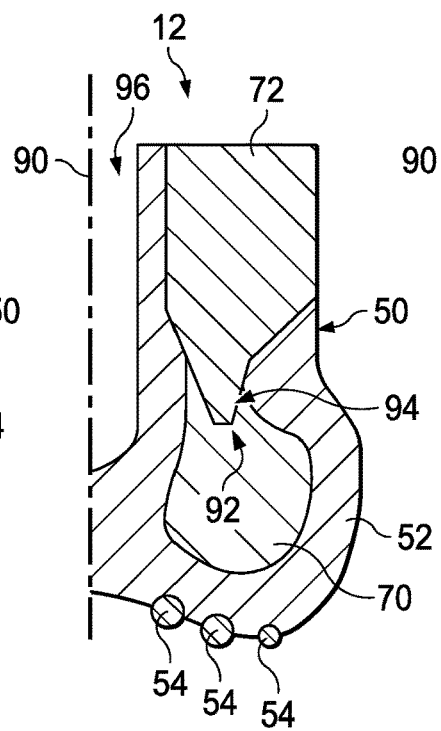
Figure 4F:
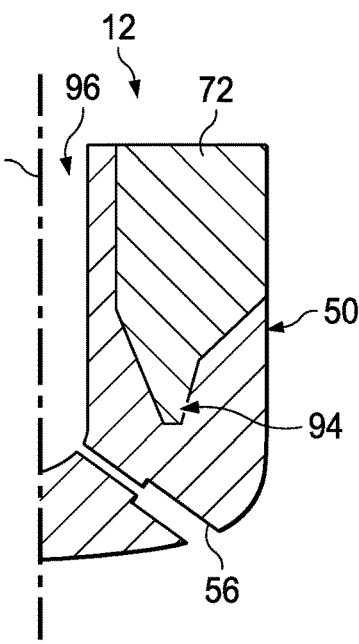

Having discussed the general layout of the bit body 50 and other components that make up the outside of the drill bit 12, a more detailed discussion of the internal bit reinforcements will be provided. To that end, FIG. 3 illustrates an embodiment of the internal components that may be located within the disclosed reinforced drill bit 12. Specifically, the drill bit components illustrated in FIG. 3 may include a plurality of bit reinforcements 70 and a shank 72.

The drill bit 12 may be produced with these bit reinforcements 70 that are completely enclosed (or with a majority of the surface area of the reinforcement 70 enclosed) within the MCC material of the bit body (e.g., 50 of FIG. 2). The bit reinforcements 70 may be made from a material with a higher elastic modulus (E) than the MMC material that forms the bit body. That is, the reinforcement material may have a higher elastic modulus than the composite formed from the binder alloy and reinforcing particles that make up the bit body.

To provide this enhanced stiffness, the bit reinforcements 70 may be constructed from metallic materials in some embodiments. Some examples of macroscopic reinforcement materials that have a relatively high elastic modulus, and therefore may be used to construct the bit reinforcements 70, are provided below in Table 1, wherein the elastic modulus is given in units of gigapascals (GPa). These materials are identified along with their elastic modulus. It may be desirable for the bit reinforcements 70 to be constructed from refractory metals that will not undergo melting during construction (i.e., casting) of the infiltrated bit body formed around the reinforcements 70.

TABLE 1

Macroscopic Bit Reinforcement Materials

| Element | E (GPa) |
| --- | --- |
| Iridium | 528 |
| Rhenium | 463 |
| Ruthenium | 447 |
| Tungsten | 411 |
| Molybdenum | 329 |
| Beryllium | 287 |
| Chromium | 279 |
| Rhodium | 275 |
| Iron | 211 |
| Cobalt | 209 |
| Uranium | 208 |
| Nickel | 200 |

The materials listed in Table 1 may be used alone or alloyed with other materials. For example, some embodiments of the drill bit 12 may include bit reinforcements 70 made from commercially available Fe-, Co-, and Ni-based alloys. It should be noted that the bit reinforcements 70 may be constructed from any other alloys that possess a suitably high elastic modulus. That is, the metal alloy should have a higher elastic modulus than the MMC material that forms the bit body of the drill bit 12. For example, Ni may be alloyed with a range of elements such as Vanadium (V), Chromium (Cr), Molybdenum (Mo), Tantalum (Ta), Tungsten (W), Rhenium (Re), Osmium (Os), or Iridium (Ir) to produce a reinforcement material with a higher elastic modulus. In still further embodiments, the bit reinforcements 70 may be constructed from alloys based on an element that is not included in Table 1, as long as the alloying addition(s) to the base element result in a sufficiently high elastic modulus.

In other embodiments, the bit reinforcements may be constructed from a ceramic material having a suitably high elastic modulus. More specifically, the bit reinforcements 70 may be made from one or several ceramic materials, such as $Al_2O_3$ (E=372 GPa), SiC (E=393 GPa), $Si_3N_4$ (E=310 GPa), or $B_4C$ (E=290 GPa). For example, certain embodiments of the drill bit 12 may include a bit body of MMC material made from infiltrated tungsten carbide particles, surrounding a number of alumina ($Al_2O_3$) bit reinforcements 70.

The bit reinforcements 70, which have a higher elastic modulus than the MMC bit body, may provide increased stiffness to the blade portions of the drill bit 12. This increased stiffness may result in less deflection on the blade portions and cutters of the drill bit 12 during drilling operations. This reduced deflection may help to mitigate and prevent undesirable degradation of the drill bit 12, thereby increasing the lifespan of the drill bit 12 or allowing the drill bit 12 to be used to advance a wellbore in a wider range of formations. In addition, the increased bulk stiffness from the bit reinforcements 70 may facilitate the use of a MMC material that has a lower stiffness and, therefore, a higher toughness than those traditionally used in drill bits.

In addition, the bit reinforcements 70 are macroscopic reinforcements, which are generally much larger than the particles that form the matrix in the MMC bit body. As a result, the bit reinforcements 70 may provide a barrier against crack propagation through the drill bit 12. For example, if a crack forms and propagates within the MMC material in the blade portion of the drill bit 12, the crack may stop propagating once it reaches the boundary of the bit reinforcement 70. In addition, the macroscopic bit reinforcements 70 may provide a surface that the MMC material of the bit body is bonded to and held against. This may make the MMC material less likely to break off from itself in response to crack propagation and general wear from the drilling operations.

As illustrated in FIG. 3, the drill bit 12 may include six bit reinforcements 70 positioned circumferentially around an edge of the bit shank 72. These bit reinforcements 70 may each be disposed in and aligned substantially with the corresponding blade portions 52 of the drill bit 12 shown in FIG. 2. That is, each of the blade portions 52 may be formed around a corresponding one of the bit reinforcements 70. In the illustrated embodiment of FIG. 3, the bit reinforcements 70 are illustrated as solid paddles that generally are shaped to fill the space available within the blade portions of the bit body of FIG. 2. The bit reinforcements 70 may generally have a uniform thickness in a direction perpendicular to a face of the paddle. However, in other embodiments, the bit reinforcements 70 may have a variable thickness in a direction perpendicular to the face of the paddle. For example, the thickness of the bit reinforcements 70 may increase with an increase in radial distance of the bit reinforcements 70 away from the shank 72. In some embodiments, the thickness of the bit reinforcements may generally track the contour (thickness) of the corresponding blade portions 52 (e.g., FIG. 2) of the drill bit 12. For example, the thickness of the bit reinforcements may increase along a dimension to conform with an increasing thickness of the corresponding blade portions 52 of the bit body 50. That way, the drill bit 12 may include a bit body having approximately the same thickness or amount of MMC material surrounding and/or enclosing the different sides of the bit reinforcements 70.

It should be noted that several variations of the macroscopic bit reinforcements 70 may be used in different embodiments of the reinforced drill bit 12. For example, some embodiments of the drill bit 12 may include a greater or lesser number of blade portions (and corresponding bit reinforcements) designed to cut into the formation. Further, and as described below, the bit reinforcements 70 may be shaped, arranged within the drill bit 12, and attached to the shank 72 in a number of different ways depending on the shape of the drill bit 12, desired stiffness of the drill bit 12, drilling operations to be performed using the drill bit 12, and manufacturing tools available for building the drill bit 12.

FIGS. 4A-4F illustrate different cross-sectional views of an embodiment of the drill bit 12 of FIG. 2. In these figures, the bit reinforcements 70 are shown to be paddle-shaped reinforcements, similar to those shown in FIG. 3. In other embodiments these bit reinforcements 70 may be different shapes. As shown in FIGS. 4A-4F, the bit reinforcements 70 may be equally sized and each one located within a corresponding blade portion 52 of the bit body 50. The illustrated bit reinforcements 70 may be equally spaced circumferentially about an axis 90 of the shank 72 (along with the blade portions 52). However, in other embodiments the bit reinforcements 70 may not be equally spaced.

As shown in the illustrated embodiment, the bit reinforcements 70 may be designed to mate directly with the shank 72 (or mandrel). As shown, the upper portion 92 of the bit reinforcements 70 may be shaped to couple with a downward facing edge or profile 94 of the shank 72. In some embodiments, the bit reinforcements 70 may be formed with upper portions 92 designed to fit into a slot, groove, or other feature formed within the shank 72. In some embodiments, the bit reinforcements 70 may be constructed with upper portions 92 shaped to interface with pre-existing drill bit shanks 72. That is, shanks 72 that are already in use with other types of drill bits may be fit with the disclosed bit reinforcements 70 to further improve the stiffness or other mechanical properties of the resulting drill bit 12.

In other embodiments of the drill bit 12, each of the bit reinforcements 70 may be attached to the shank 72 using a third member that would fit through holes, slots, or other suitable features formed in the bit reinforcement 70 and the shank 72. Examples of such third members may include mechanical fasteners, tie rods, and other components for mechanically coupling two components in a desired arrangement.

In still other embodiments, the bit reinforcements 70 may each be permanently attached to the shank 72 via a suitable joining technique. Such joining techniques may include, for example, welding, brazing, friction welding, inertial joining, or any other method for joining two solid components. An appropriate method of joining the bit reinforcements 70 to the shank 72 may be determined based on the materials used to make up the bit reinforcements 70 and/or the shank 72. In some embodiments, the shank 72 may be a steel component, whereas different materials that may be used for the disclosed bit reinforcements 70 are outlined above.

In further embodiments, the bit reinforcements 70 and the shank 72 may not be physically attached at all prior to infiltrating the MMC material to form the bit body 50 around the bit reinforcements 70 and the shank 72. In such instances, the bit reinforcements 70 still may feature the upper portion 92 shaped to interface with the profile 94 of the shank 72 so that the reinforcements 70 may be positioned within the mold, and then the shank 72 may be positioned on top of and held in place by the bit reinforcements 70. The matching profiles between the reinforcements 70 and the shank 72 may be used to ensure a proper alignment of these separate parts within the mold.

To construct the illustrated drill bit 12, the shank 72 and the bit reinforcements 70 may be positioned at a desired location within a mold (e.g., graphite mold) used to cast the bit body 50. The mold (not shown) may be shaped to provide negative space for the infiltrated MMC material to fill, to form the bit body 50 with the various blade portions 52. The mold itself, along with solid displacements formed of a suitable material, such as sand or graphite, removably disposed within the mold, may occupy the space used to form the nozzle channels 56 and space used to form a central passage 96 through the bit body 50 leading to the nozzle channels 56. In some embodiments, the cutters 54 may be positioned within the mold prior to the formation of the bit body 50. In other embodiments, however, the cutters 54 may be brazed or otherwise attached to the fully formed bit body 50 after the bit body 50 is cast in the mold.

In some embodiments, all of the bit reinforcements 70 and the shank 72 may be positioned within the mold prior to the addition of any MMC materials. However, in other embodiments, a first layer of the reinforcement powder may be poured into the mold prior to positioning the bit reinforcements 70 and the shank 72. This may ensure that the MMC material used to form the bit body 50 is able to reach to the bottom and fill all the space available within the mold.

Once the bit reinforcements 70 and the shank 72 are positioned as desired within the mold, the powder component of the MMC material may be poured into the remaining space available in the mold. It may be desirable to position the bit reinforcements 70 such that they are in contact with (or coupled to) the shank 72, so that less powder is needed to fill the available space within the mold. The use of bit reinforcements 70 may reduce the cost of manufacturing the drill bit 12 by reducing the use of reinforcement powder material needed for the bit body 50.

Once the mold is filled with the powder, it may be desirable to pour a molten material (e.g., bonding agent) into the mold. The bonding agent may have a lower melting point than the mold, the shank 72, the bit reinforcements 70, and any other objects positioned within the mold to form negative space. This molten bonding agent may infiltrate the spaces between the reinforcing particulate (powder) loaded in the mold.

After infiltration, the MMC material may be cooled in the mold, to fully form the bit body 50 in a desired shape. Once the composite is cooled, the drill bit 12 may be removed from the mold (or the mold may be broken from around the bit body 50 to release the drill bit 12. In some embodiments, a portion of the initial piece of metal (e.g., steel) forming the shank 72 may be machined away (not shown) to produce the desired drill bit 12.

As mentioned above, the bit reinforcements 70 of the presently disclosed drill bit 12 may be formed in many different shapes and sizes. FIGS. 5A-5D illustrate four different possible shapes that may be used for the bit reinforcements 70, in addition to or in lieu of the paddle shape described above. In each of these figures, the design of the bit reinforcement 70 is shown in two dimensions, although it should be noted that these can be generalized to three dimensional shapes of the corresponding bit reinforcements 70. These different designs may be selected for a number of different reasons, such as to minimize the amount of reinforcing material needed to construct the drill bit 12 or to optimize other parameters (e.g., ease of infiltration, stress/strain transfer within the drill bit, mechanical interlocking with the MMC material, etc.).

FIGS. 5A and 5B both illustrate embodiments of the bit reinforcement 70 that feature a paddle shape with one or more holes (or hollow regions) formed therein. FIG. 5A, for example, shows a bit reinforcement 70 that includes a paddle shape 110 with a plurality of holes or hollow portions 112. The bit reinforcement 70 of FIG. 513 may include a paddle shape 110 with a single large hollow portion 114 formed therein. In either of the embodiments of FIGS. 5A and 5B, the hollow portions may be filled in with another material or left open.

When the hollow portions (112, 114) are left open, the resulting drill bit may include sufficient blade stiffening while reducing the cost of the bit reinforcement 70. That is, the bit reinforcement 70 may be produced with an expensive stiff and refractory metal or alloy without adding an unnecessary amount of bit reinforcement material.

In some embodiments, the hollow portions (112, 114) could be filled in with a different material than the high stiffness material of the paddle shaped portion 110 of the bit reinforcement 70. For example, the hollow portions (112, 114) may be filled in with a variety of materials and material formats. Suitable materials includes ceramic and metals while suitable material formats include materials in the form of beads, particulates, sintered particles, flakes, fibers, sheets, bricks, stones, blocks, cast shapes, molded shapes, and foams. In some embodiments, the hollow portions may be filled with a material that is less stiff or more ductile than the material used for the outer paddle shaped portion 110. Filling in the hollow portions (112, 114) with such materials may provide an additional layer of protection from crack propagation through the drill bit. Such materials may also lower the cost of bit manufacture, as they may displace potentially expensive bit reinforcement material or reinforcement powder material. Any cracks that reach the bit reinforcements 70 would have to travel across the boundary of the hollow portions (112, 114) and through the internal material before they could pass through the blade portion of the drill bit. In the filled-in embodiments, the bit reinforcements 70 may be fully formed with the added material disposed in the hollow portions (112, 114) prior to placement of the bit reinforcements in the mold and the infiltration process.

FIG. 5C illustrates an embodiment of the bit reinforcement 70 that includes a C-shaped or hook-like design. The hook-like design of the bit reinforcement 70 may feature an outer contour 116 designed to extend in a curved shape in a direction of one side of the corresponding blade profile of the bit body. Specifically, the outer contour 116 may be a rounded edge designed to extend along a radially outward facing edge of the corresponding blade portion. This C-shaped design may be suitable for further optimizing cost of drill bit manufacture, where a stiffer material is most needed along an outside cutting edge of each blade portion but is not critical in the body of the blade.

FIG. 5D illustrates an embodiment of the bit reinforcement 70 that include a protruding rod 118 designed to extend downward and radially outward from the shank into the corresponding blade portion of the bit body. Although only one rod 118 (or prong) is shown in the illustrated embodiment, other embodiments of the bit reinforcement 70 may feature additional rods 118 radiating outward from the point where the bit reinforcement 70 couples to the shank. This rod design for the bit reinforcement 70 may be used when it is desirable to save on material cost or manufacture of the bit reinforcement 70, since the rod shape is fairly simple and may be easy to manufacture.

It should be noted that different types of materials used to construct the stiff bit reinforcements 70 may be more appropriate for use with certain shapes and designs of the bit reinforcements 70. For example, ceramic materials having a high elastic modulus may be particularly suitable for use with bit reinforcements shaped like hooks (e.g., FIG. 5C) or including one, two, or more prongs (e.g., FIG. 5D). This is because the ceramic material used for the bit reinforcement 70 may have a relatively different coefficient of thermal expansion (CTE) compared to the MMC material forming the surrounding bit body. Thermally induced strains and stresses caused by the bit reinforcement 70 relative to the surrounding material may be minimized by the thinner rod-shaped and/or hook-shaped design. Metallic materials having a high elastic modulus may be particularly suitable for use with bit reinforcements 70 with the larger paddle-based designs (e.g., FIGS. 3, 5A, and 5B), since the CTE for the metallic material may be less mismatched from the surrounding infiltrated material.

FIGS. 6A-6F illustrate different cross-sectional views of another embodiment of the drill bit 12 of FIG. 2. In these figures, the bit reinforcements 70A and 70B are shown to be paddle-shaped reinforcements, similar to those shown in FIGS. 3 and 4A-4F. However, unlike those figures described above, the bit reinforcements 70A and 70B of two adjacent blade portions 52 of the drill bit 12 are different sizes. As shown in FIGS. 6B and 6E, for example, the bit reinforcement 70A is larger than the bit reinforcement 70B.

The different sizes of the bit reinforcements 70A and 70B shown in these cross sections may correlate to blades of different sizes. That is, the illustrated cross section of the larger bit reinforcement 70A may be taken from a radial position that intersects corresponding principal blade of the drill bit 12, as shown in FIG. 2. The illustrated cross section of the smaller bit reinforcement 70B, on the other hand, may be taken from a secondary blade. Accordingly, the bit reinforcements 70A and 70B shown in FIGS. 6B and 6E may each have the same volume ratio, which may be defined as the volume of the bit reinforcement 70 divided by the volume of the corresponding blade. However, it should be noted that in other embodiments, it may be desirable to include bit reinforcements 70 of differing volume ratios in the different blades.

In the embodiment of the drill bit shown in FIGS. 6A-6F, all of the bit reinforcements 70 may be connected together at a center point 130 disposed along the axis 90. The center point 130 may keep all the bit reinforcements 70 fixed relative to each other within the drill bit 12. In other embodiments, all of the bit reinforcements 70 may be connected together via a ring feature that is concentric with the axis 90. The ring feature may generally extend through the bit body 50 circumferentially at a point that is a radial distance from the axis 90. In some embodiments, the upper portions 92 of the bit reinforcements 70 may be joined or formed together in one piece with a suitable ring-like feature at the top, and this ring-like feature could interface directly with the shank 72. Using such joining techniques to couple the bit reinforcements 70 together may increase the ease of infiltration of the bit body 50, the ease of manufacture of the bit reinforcements, and the ease of positioning the bit reinforcements 70 within the mold. Further, the joining techniques for linking the bit reinforcements 70 to each other may help improve the transfer of stresses and strains through the drill bit 12 during drilling operations.

FIGS. 7 and 8 illustrate other embodiments of a cross section of the bit reinforcement 70 that may be utilized in the disclosed infiltrated MMC drill bit 12. FIG. 7 shows a bit reinforcement 70 that features an outer layer 150 surrounding a more uniform internal portion 152. The outer layer 150 may be designed to promote interfacial bonding between the bit reinforcement 70 and the surrounding MMC material of the bit body. This interfacial bonding may help to direct crack propagation from the bit body into the bit reinforcement 70, rather than along the interface between bit reinforcement 70 and the MMC material, to prevent pieces of the bit body blade portions from breaking off in response to forces on the drill bit.

In some embodiments, the outer layer 150 may include an external coating that is applied to the internal portion 152 of the bit reinforcement 70. Since many ceramic materials are not wettable, and cannot be bonded to by many molten metals, this coating may produce, enhance, or otherwise increase bonding between a bit reinforcement 70 formed of a ceramic material and the MMC material. In other embodiments, the outer layer 150 may increase or improve bonding or diffusion between a metallic bit reinforcement material and the MMC material. The outer layer 150 may also help to create a functional gradient between the bit reinforcement 70 and MMC material such that differences in strain can be more easily accommodated across the dissimilar-material interface. While the outer layer 150 may not be necessary to cause such reactions or interdiffusion with the bit reinforcement material, it may provide enhanced bonding strength. In yet other embodiments, the outer layer 150 may prevent significant interaction between the bit reinforcement material and the MMC material.

In other embodiments, the outer layer 150 may include an outer portion of the bit reinforcement 70 that has received a surface treatment leaving the surface rough. For example, during manufacture of the bit reinforcement 70, the bit reinforcement 70 may first be machined to a desired shape, and then a shot peening process (or other abrasive process) may be performed on the surface of the bit reinforcement 70. For example, in embodiments where the bit reinforcement 70 is constructed from a ceramic material, portions of the ceramic bit reinforcement 70 may be etched away from the outside surface, thereby leaving a lower density shell with a higher surface area for interfacial bonding with the surrounding composite material. This type of abrasive surface treatment may be used in addition to, or in lieu of, a coating applied to the outside of the bit reinforcement 70. Other surface features may also be produced on an outer portion of the bit reinforcement 70 to enhance bonding with the MMC material. Suitable surface features may comprise, but are not limited to, small-scale undulations, crenellations, steps, waves, dimples, recesses, protrusions, nubs, fins, threads, miters, dovetails, knurling, any combination thereof, and the like.

As illustrated in FIG. 8, some embodiments of the bit reinforcement 70 may feature multiple layers 154 that are built up with one layer over another to form the bit reinforcement 70. The bit reinforcement 70 may be produced using an additive manufacturing process to build up these layers 154. The different layers 154 may be formed from one material or from a variety of materials, and the different layers 154 may be formed from materials arranged in different ways. For example, some layers 154 may be solid layers of material. Other layers 154, especially more internal layers, may be arranged in a grid, mesh, or honeycomb pattern, to leave open space to reduce the weight toward the center of the bit reinforcement 70. The layers 154 toward the outside may be constructed from materials or structures having higher strengths and/or stiffness than the more internal layers. The illustrated bit reinforcement may also include the outer layer 150 having a surface treatment or coating that, as described above, promotes interfacial bonding with the bit body material.

Additive manufacturing allows structures for bit reinforcements that are difficult or impossible to achieve via other manufacturing methods. The bit reinforcements described herein may be manufactured using any known additive manufacturing technique. For example, metallic structures may be produced by processes such as, but not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], any combination thereof, and the like. Some of these processes could also be used to produce ceramic structures.

Embodiments Disclosed Herein Include:

A. A drill system including a bit body and a plurality of bit reinforcements at least partially enclosed within the bit body. The bit body includes a metal-matrix composite (MMC) material, and the bit body also includes a plurality of blade portions extending radially outward and downward to contact a subterranean formation. The plurality of bit reinforcements are at least partially enclosed within the bit body, and the plurality of bit reinforcements are each disposed in and aligned substantially with a corresponding one of the plurality of blade portions. The plurality of bit reinforcements each have a higher elastic modulus than the MMC material.

B. A method includes disposing a shank within a mold and disposing a plurality of bit reinforcements within the mold such that the plurality of bit reinforcements are positioned adjacent to an end of the shank. The method also includes filling the mold with a metal-matrix composite (MMC) material to form a bit body including a plurality of blade portions extending radially outward and downward away from the end of the shank. The MMC material at least partially encloses the plurality of bit reinforcements within the bit body such that each of the plurality of bit reinforcements are each disposed in and aligned substantially with a corresponding one of the plurality of blade portions, and the plurality of bit reinforcements each have a higher elastic modulus than the metal-matrix composite material.

Each of the embodiments A and B may have one or more of the following additional elements in combination: Element 1: further including a shank coupled to an end of the bit body opposite the plurality of blade portions for connecting the bit body to an upstream component of a drill string, wherein the plurality of bit reinforcements are all connected together via a ring extending concentrically around an axis of the shank, truss rods or arcs, or at a center point. Element 2: further including a shank coupled to an end of the bit body opposite the plurality of blade portions for connecting the bit body to an upstream component of a drill string, wherein the plurality of bit reinforcements are coupled to the shank and are separate components from each other. Element 3: wherein the plurality of bit reinforcements include at least one material selected from the group of materials containing: iridium, rhenium, ruthenium, tungsten, molybdenum, beryllium, chromium, rhodium, iron, cobalt, uranium, nickel, vanadium, tantalum, osmium, and alloys thereof. Element 4: wherein at least one of the plurality of bit reinforcements includes a ceramic material. Element 5: wherein at least one of the plurality of bit reinforcements includes a thickness that increases along a dimension of the bit reinforcement to conform with an increasing thickness of the corresponding one of the plurality of blade portions of the bit body. Element 6: wherein at least one of the plurality of bit reinforcements is a different size from at least one other of the plurality of bit reinforcements. Element 7: wherein at least one of the plurality of bit reinforcements includes one or more hollow portions formed through the bit reinforcement. Element 8: wherein the one or more hollow portions are filled in with a material or material format different from the material of the bit reinforcement. Element 9: wherein the one or more hollow portions are filled in with a material arranged in at least one material format selected from the group consisting of: beads, particulates, sintered particles, flakes, fibers, sheets, bricks, stones, blocks, cast shapes, molded shapes, and foams. Element 10: wherein at least one of the plurality of bit reinforcements includes an outer coating. Element 11: wherein at least one of the plurality of bit reinforcements includes a surface treatment or other surface features produced on an outer portion of the bit reinforcements to enhance bonding with the MMC material. Element 12: wherein at least one of the plurality of bit reinforcements includes one or more layers of material formed via additive manufacturing. Elements 13: wherein at least one of the plurality of bit reinforcements is C-shaped having a rounded edge that extends along a radially outward facing edge of the corresponding blade portion. Element 14: wherein at least one of the plurality of bit reinforcements includes a rod protruding through the corresponding blade portion.

Element 15: further including coupling each of the plurality of bit reinforcements to the shank prior to disposing the shank within the mold. Element 16: further including coupling the plurality of bit reinforcements to each other via a ring, truss rods or arcs, or at a center point. Element 17: further including coating at least one of the plurality of bit reinforcements. Element 18: further including forming at least one of the plurality of bit reinforcements by additive manufacturing.

Although the present disclosure and its advantages have been described in detail, it should be understood that various changes, substitutions and alterations can be made herein without departing from the spirit and scope of the disclosure as defined by the claims.

What is claimed is:

1. A drill bit system, comprising:
   a bit body comprising a metal-matrix composite (MMC) material, wherein the bit body comprises a plurality of blade portions extending radially outward and downward to contact a subterranean formation;
   a plurality of bit reinforcements at least partially enclosed within the bit body, wherein the plurality of bit reinforcements are each disposed in and aligned substantially with a corresponding one of the plurality of blade portions, wherein the plurality of bit reinforcements each have a higher elastic modulus than the MMC material; and
   a shank coupled to an upper end of the drill bit body opposite the plurality of blade portions;
   wherein each of the plurality of bit reinforcements has a rounded shape that protrudes downward from the shank into the MMC material, wherein the MMC material surrounds the rounded shape at least along a radially outward facing edge of the rounded shape;
   wherein each of the plurality of bit reinforcements comprises an upper portion shaped to interface with the shank, wherein the rounded shape of each bit reinforcement is defined by a radially outward facing edge with a convex surface extending both downward and radially outward with respect to the upper portion.

2. The drill bit system of claim 1, wherein the plurality of bit reinforcements are all connected together via a ring extending concentrically around an axis of the shank, truss rods or arcs, or at a center point.

3. The drill bit system of claim 1, wherein the plurality of bit reinforcements are each coupled directly to the shank and are separate components from each other.

4. The drill bit system of claim 1, wherein the plurality of bit reinforcements comprise at least one material selected from the group of materials containing: iridium, rhenium, ruthenium, tungsten, molybdenum, beryllium, chromium, rhodium, iron, cobalt, uranium, nickel, vanadium, tantalum, osmium, and alloys thereof.

5. The drill bit system of claim 1, wherein at least one of the plurality of bit reinforcements comprises a ceramic material.

6. The drill bit system of claim 1, wherein at least one of the plurality of bit reinforcements comprises a thickness that increases along a dimension of the bit reinforcement to conform with an increasing thickness of the corresponding one of the plurality of blade portions of the bit body.

7. The drill bit system of claim 1, wherein at least one of the plurality of bit reinforcements is a different size from at least one other of the plurality of bit reinforcements.

8. The drill bit system of claim 1, wherein at least one of the plurality of bit reinforcements includes an outer coating, a surface treatment, or other surface features produced on an outer portion of the bit reinforcements.

9. The drill bit system of claim 1, wherein the MMC material further surrounds the rounded shape along a lower end of the rounded shape opposite the shank, and at a location where the rounded shape contacts the shank.

10. The drill bit system of claim 1, wherein the rounded shape of each bit reinforcement is a rounded paddle shape defined by:
    the radially outward facing edge with the convex surface extending both downward and radially outward with respect to the upper portion; and
    a radially inward facing edge with a convex surface extending both downward and radially inward with respect to the upper portion.

11. The drill bit system of claim 10, wherein at least one of the plurality of bit reinforcements has one or more hollow portions formed within the rounded paddle shape.

12. The drill bit system of claim 11, wherein the one or more hollow portions are filled in with a material or material format different from the material of the bit reinforcement.

13. The drill bit system of claim 12, wherein the one or more hollow portions are filled in with a material arranged in at least one material format selected from the group consisting of: beads, particulates, sintered particles, flakes, fibers, sheets, bricks, stones, blocks, cast shapes, molded shapes, and foams.

14. The drill bit system of claim 11, wherein the one or more hollow portions are entirely enclosed within the rounded paddle shape.

15. The drill bit system of claim 1, wherein the rounded shape of each of the plurality of bit reinforcements is a rounded hook shape defined by:
   the radially outward facing edge with the convex surface extending both downward and radially outward with respect to the upper portion; and
   a radially inward facing edge with a concave surface.

16. A method for manufacturing a drill bit system, comprising:
   disposing a shank within a mold;
   disposing a plurality of bit reinforcements within the mold such that the plurality of bit reinforcements are positioned adjacent to an end of the shank; and
   filling the mold with a metal-matrix composite (MMC) material to form a bit body comprising a plurality of blade portions extending radially outward and downward away from the end of the shank, wherein the MMC material at least partially encloses the plurality of bit reinforcements within the bit body such that each of the plurality of bit reinforcements are disposed in and aligned substantially with a corresponding one of the plurality of blade portions, wherein the plurality of bit reinforcements each have a higher elastic modulus than the metal-matrix composite material;
   wherein each of the plurality of bit reinforcements has a rounded shape that protrudes downward from the shank into the MMC material;
   wherein upon filling the mold with the MMC material, the MMC material surrounds the rounded shape at least along a radially outward facing edge of the rounded shape;
   wherein each of the plurality of bit reinforcements comprises an upper portion shaped to interface with the shank, wherein the rounded shape of each bit reinforcement is defined by a radially outward facing edge with a convex surface extending both downward and radially outward with respect to the upper portion.

17. The method of claim 16, further comprising coupling each of the plurality of bit reinforcements directly to the shank prior to disposing the shank within the mold.

18. The method of claim 16, further comprising coupling the plurality of bit reinforcements to each other via a ring, truss rods or arcs, or at a center point.

19. The method of claim 16, further comprising coating at least one of the plurality of bit reinforcements.

20. The method of claim 16, further comprising forming at least one of the plurality of bit reinforcements by additive manufacturing.

* * * * *